Dec. 27, 1927.

P. PASZKOWSKI

LAMINATED CORE

Filed Jan. 22, 1925

1,654,306

WITNESSES:
A. J. Schiefelbein
E. R. Evans

INVENTOR
Paul Paszkowski
BY
ATTORNEY

Patented Dec. 27, 1927.

1,654,306

UNITED STATES PATENT OFFICE.

PAUL PASZKOWSKI, OF IRVINGTON, NEW JERSEY, ASSIGNOR TO WESTINGHOUSE ELECTRIC & MANUFACTURING COMPANY, A CORPORATION OF PENNSYLVANIA.

LAMINATED CORE.

Application filed January 22, 1925. Serial No. 4,028.

My invention relates to laminated core members for alternating-current devices and particularly to improved means for binding the laminations together in assembled relation to form a unitary structure.

The object of my invention is to provide a laminated magnetizable core member having laminations that are secured together by a plurality of rivets, the rivets being disposed in such a manner that the permeance of the core member to magnetic flux is not affected. The core member is preferably slotted at various points in its periphery and a metal rivet slightly larger than the slots is compacted into each slot to bind the laminations together.

Figure 1:
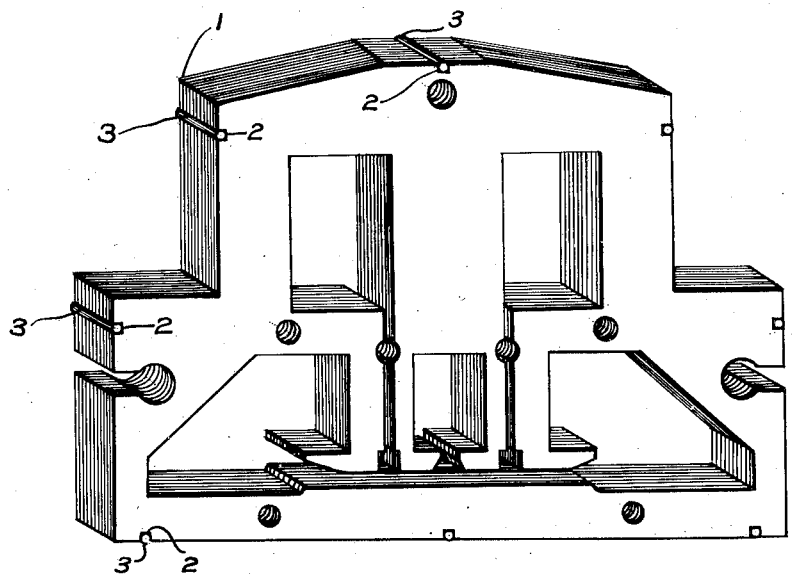
Figure 2:
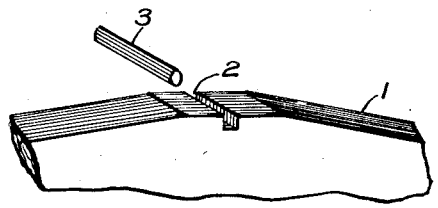

The nature of my invention will be apparent from the accompanying drawing, in which Fig. 1 is a perspective view of a laminated core member for a watthour meter or induction relay embodying my invention, and Fig. 2 is a detail view to an enlarged scale, showing the method of carrying out the invention.

Referring to the drawing, a laminated magnetizable core member 1 is shown that comprises a plurality of thin laminations of soft iron. A magnetizable core member of this construction is adapted for use in alternating-current measuring instruments, such as integrating meters of the induction type or induction relays, but the invention may be utilized wherever it is desired to fasten together a plurality of thin laminations of a material having similar structural characteristics.

In a laminated core member for alternating-current devices, it is essential that the laminations, which may be considerable in number and of intricate shape, be tightly compressed and permanently secured together in this relation. This requirement must be met not only for reasons of compactness and mechanical strength, but because the alternating-current that flows through the windings disposed on such a core member causes vibration of the laminations which results in noise and in gradual loosening of the laminations when ordinary fastening means is employed.

In carrying out the invention, each lamination is slotted at several points in its periphery, as indicated at 2, and the laminations are then stacked and compressed together, a sufficient number of laminations being used to provide a core member 1 of the desired thickness. A rivet 3, such as a piece of metal wire of slightly larger diameter than the width of the slot 2 is then compacted into each slot with a hammer or similar tool. The rivet 3 is preferably of a soft metal, such as copper. When the rivet is compacted into the slots, the metal flows into the interstices between the laminations and holds each lamination securely in place. The ends of the copper rivets 3 are then cut off flush with the faces of the core member 1, as shown in Fig. 1, and the assembly of the core member is completed.

Inasmuch as the rivets 3 are located in the periphery of the core member 1 and are not surrounded by the iron of the laminations, the magnetic flux traversing the core member is not affected by the addition of the rivets, as would be the case if they were inserted in perforations in the laminations in the usual manner. Furthermore, the rivets shown possess the additional advantages over ordinary rivets that they are flush with both faces of the core member and that the expansion of the metal into the slots firmly secures each individual lamination to the rivet and does not merely engage the end laminations.

I do not consider that my invention is limited to the precise arrangement shown and described or to the metals that have been mentioned. Accordingly, I do not intend that the invention should be limited in scope except as indicated in the appended claims.

I claim as my invention:

1. The method of constructing a laminated member which comprises slotting the edges of the laminations, compressing a number of the laminations sufficiently to form a member of the desired thickness and compacting a binding element transversely into each of the slots to hold the laminations in assembled relation.

2. The method of holding a plurality of laminations in stacked formation, which comprises assembling a plurality of peripherally slotted laminations with their slots in alinement, and forcing a soft metallic substance while in its malleable state into said slots and into the spaces between adjacent laminations.

3. The method of securing laminæ in fixed spaced relationship, which comprises slotting each lamination at several points in its periphery, stacking and compressing the laminæ together, compacting a cold metal substance into the slots and cutting off the excess metal flush with the faces of the outer laminæ.

4. The method of securing laminæ in fixed spaced relationship, which comprises slotting each lamination at several points in its periphery, stacking the laminæ together, forcing a binding material into the said slots, and removing the excess material projecting from the faces of the outer laminæ.

5. The method of holding a plurality of laminations in stacked formation, which comprises assembling a plurality of peripherally slotted laminations with their slots in alinement, forcing a soft metallic substance while in its malleable state into said slots and into the spaces between adjacent laminations, and removing the excess metal flush with the faces of the outer laminations.

In testimony whereof, I have hereunto subscribed my name this 18 day of December, 1924.

PAUL PASZKOWSKI.